(12) United States Patent
Ono et al.

(10) Patent No.: US 9,960,408 B2
(45) Date of Patent: May 1, 2018

(54) SECONDARY CELL MANUFACTURING METHOD

(71) Applicant: TOYOTA JIDOSHA KABUSHIKI KAISHA, Toyota-shi, Aichi-ken (JP)

(72) Inventors: Tomohiro Ono, Miyoshi (JP); Masaki Koike, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/383,501

(22) Filed: Dec. 19, 2016

(65) Prior Publication Data

US 2017/0187027 A1    Jun. 29, 2017

(30) Foreign Application Priority Data

Dec. 24, 2015    (JP) ................. 2015-252045

(51) Int. Cl.
*H01M 2/36*    (2006.01)
*H01M 2/04*    (2006.01)

(52) U.S. Cl.
CPC ......... *H01M 2/365* (2013.01); *H01M 2/0456* (2013.01)

(58) Field of Classification Search
CPC ................. H01M 2/365; H01M 2/0456
See application file for complete search history.

(56) References Cited

U.S. PATENT DOCUMENTS

| | | | |
|---|---|---|---|
| 2011/0108134 A1* | 5/2011 | Nishimura | H01M 2/361 137/260 |
| 2012/0040230 A1* | 2/2012 | Sudworth | H01M 4/38 429/131 |
| 2015/0228936 A1 | 8/2015 | Kajiwara | |

FOREIGN PATENT DOCUMENTS

JP    5475206 B1    2/2014

* cited by examiner

*Primary Examiner* — Stewart A Fraser
(74) *Attorney, Agent, or Firm* — Sughrue Mion, PLLC

(57) ABSTRACT

A secondary cell manufacturing method includes the steps of: disposing a cap including a magnetic body so as to cover a liquid injection hole provided in a lid member; disposing the lid member so as to cover an opening of an outer case; and bringing close to each other the magnetic body and a magnetic body that applies a magnetic force to the magnetic body, and so holding the position of the cap that is disposed to cover the liquid injection hole by the magnetic force applied from the magnetic body to the magnetic body.

13 Claims, 17 Drawing Sheets

SECONDARY CELL MANUFACTURING METHOD

INCORPORATION BY REFERENCE

The disclosure of Japanese Patent Application No. 2015-252045 filed on Dec. 24, 2015 including the specification, drawings and abstract is incorporated herein by reference in its entirety.

BACKGROUND

1. Technical Field

The present disclosure relates to a secondary cell manufacturing method.

2. Description of Related Art

Secondary cells are installed in electric appliances, such as personal computers, in electric vehicles, and the like. As disclosed in Japanese Patent No. 5475206, a lid member is welded to an outer case in a secondary cell manufacturing method.

The lid member has a liquid injection hole, which makes it necessary, for example, when welding the lid member to the outer case, to prevent as far as possible welding spatter etc. from entering inside the outer case through the liquid injection hole. One can prevent welding spatter etc. from entering inside the outer case through the liquid injection hole during welding by attaching a tape so as to cover the liquid injection hole or disposing a cap so as to cover the liquid injection hole.

After the lid member is welded to the outer case, the cap etc. is removed from the lid member and the liquid injection hole is revealed to inject an electrolytic solution through the liquid injection hole into the outer case. After initial charging, gas venting, etc. are performed, a seal member is disposed so as to cover the liquid injection hole. The liquid injection hole is sealed as the seal member is welded to the lid member.

SUMMARY

Here, using a tape as means for covering the liquid injection hole during welding etc. has disadvantages in that the decreasing adhesive power of the tape makes it difficult to repeatedly use the tape, and that the glue of the tape may remain on the lid member after the tape is removed from the lid member. On the other hand, a cap can be used repeatedly if an adhesive etc. is not used, and therefore using a cap is more advantageous than using a tape.

Suppose that a cap is disposed so as to cover the liquid injection hole before the step of welding the lid member to the outer case. Then, an external force due to vibration, wind pressure, etc. is likely to act on the cap during welding, so that the cap covering the liquid injection hole may be displaced, or the cap may be disengaged from the liquid injection hole. If the cap is not fixed to the lid member with an adhesive, displacement, fall, etc. of the cap are more likely to occur.

It is not only during welding of the lid member to the outer case that displacement, fall, etc. of the cap can occur. The lid member and the cap are sometimes integrally transferred in a state where the cap is disposed to cover the liquid injection hole. During the transfer, an external force due to vibration etc. may act on the cap. Thus, displacement, fall, etc. of the cap can occur during the transfer as well.

If displacement, fall, etc. of the cap have occurred, foreign substances, such as welding spatter and resin, may enter inside the outer case through the liquid injection hole. The foreign substances having entered inside the outer case affect the performance of the secondary cell by causing short-circuit, a decrease in output, etc.

The present disclosure provides a secondary cell manufacturing method that can reduce the likelihood of displacement of the cap that is disposed to cover the liquid injection hole and of disengagement of the cap from the liquid injection hole.

A first aspect of the present disclosure relates to a secondary cell manufacturing method including: disposing a cap having a first magnetic body so as to cover a liquid injection hole provided in a lid member; disposing the lid member so as to cover an opening of an outer case; and bringing close to each other the first magnetic body and a second magnetic body that applies a magnetic force to the first magnetic body, such that a position of the cap that is disposed to cover the liquid injection hole is held by the magnetic force between the first magnetic body and the second magnetic body.

It makes no difference whether the step of disposing the cap or the step of disposing the lid member is performed first. The technical scope of the above configuration includes both a configuration in which the step of disposing the cap is performed first and then the step of disposing the lid member is performed and a configuration in which the step of disposing the lid member is performed first and then the step of disposing the cap is performed. The technical scope of the above configuration further includes a configuration in which the step of holding the position of the cap by the magnetic force is performed at the same time as either the step of disposing the cap or the step of disposing the lid member. For example, the position of the cap may be held by the magnetic force as the first magnetic body and the second magnetic body are brought close to each other by the step of disposing the cap so as to cover the liquid injection hole provided in the lid member. Alternatively, the position of the cap may be held by the magnetic force as the first magnetic body and the second magnetic body are brought close to each other by the step of disposing the lid member so as to cover the opening of the outer case. The technical scope of the above configuration is not limited to these configurations but further includes a case where the steps of disposing the cap, disposing the lid member, and holding the position of the cap by the magnetic force are independently performed.

An external force due to vibration etc. may act on the cap while the lid member is welded to the outer case, or while the outer case, the lid member, and the cap are transferred to a place where welding is performed. According to the above configuration, it is possible to hold the position of the cap that is disposed to cover the liquid injection hole by the magnetic force applied from the second magnetic body to the first magnetic body without the trouble of bonding the cap to the lid member with an adhesive etc. Displacement of the cap covering the liquid injection hole and disengagement of the cap from the liquid injection hole can be restrained. Since a magnetic force is used instead of an adhesive, the cap can be easily attached to and detached from the liquid injection hole and the cap can be repeatedly used as means for covering the liquid injection hole.

In the first aspect of the present disclosure, when the position of the cap is held by the magnetic force, the second magnetic body may be disposed so as to face a side surface of the outer case, so that the first magnetic body and the second magnetic body are magnetically attracted to each other through the side surface of the outer case.

According to the above configuration, the position of the cap that is disposed to cover the liquid injection hole is held by magnetic attraction between the first magnetic body and the second magnetic body disposed to face the side surface of the outer case. Since the second magnetic body is not disposed on the upper side of the outer case and the lid member, a laser head etc. can be easily disposed on the upper side of the outer case and the lid member.

The first aspect of the present disclosure may further include welding the lid member to the outer case, wherein the lid member may be welded to the outer case in a state where the position of the cap is held by the magnetic force.

An external force due to vibration, wind pressure, etc. is likely to act on the cap while the lid member is welded to the outer case. According to the above configuration, the position of the cap that is disposed to cover the liquid injection hole is held with high accuracy by the magnetic force between the first magnetic body and the second magnetic body. Thus, displacement of the cap covering the liquid injection hole and disengagement of the cap from the liquid injection hole can be restrained, so that foreign substances, such as welding spatter, can be prevented from entering inside the outer case through the liquid injection hole.

The first aspect of the present disclosure may further include, before welding the lid member to the outer case, transferring the outer case, the lid member, and the cap, in a state where the cap is disposed over the liquid injection hole and the lid member is disposed over the opening of the outer case, to a place where welding of the lid member is performed, wherein, during transfer of the outer case, the lid member, and the cap, the position of the cap may be held by a magnetic repulsive force applied from the second magnetic body to the first magnetic body.

In the first aspect of the present disclosure, the cap may have a flange part that is disposed so as to cover the liquid injection hole and an insert part that is inserted into the liquid injection hole, and in a state where the position of the cap is held by the magnetic force, the flange part of the cap may be disposed so as to face a portion of the lid member around the liquid injection hole, with a communication path that allows communication between the inside and the outside of the outer case formed between the portion around the liquid injection hole and the flange part.

Even if the pressure inside the outer case has risen due to welding heat during welding, gas inside the outer case can be discharged through the communication path, so that lifting of the cap covering the liquid injection hole and disengagement of the cap from the liquid injection hole can be restrained.

In the first aspect of the present disclosure, the communication path may be a recessed groove provided in the flange part.

In the first aspect of the present disclosure, the cap may include the first magnetic body and a resin member with the first magnetic body embedded inside.

If a resin member that is sufficiently softer than the lid member is used, it is possible to prevent the cap from damaging the inner circumferential surface of the liquid injection hole while the cap is attached to or detached from the liquid injection hole.

In the first aspect of the present disclosure, the resin member may be made of perfluoro-alkoxyfluoro plastics.

In the first aspect of the present disclosure, when the cap is disposed so as to cover the liquid injection hole provided in the lid member, the cap may be transferred by a transfer mechanism including a third magnetic body, and the first magnetic body and the third magnetic body may be magnetically attracted to each other while the transfer mechanism is transferring the cap.

Using the magnetic attractive force acting between the first magnetic body and the third magnetic body, the transfer mechanism can quickly and easily attach and detach the cap to and from the liquid injection hole.

In the first aspect of the present disclosure, the transfer mechanism may include a guide that has a contact surface with which a top surface of the cap is in contact in a state where the first magnetic body and the third magnetic body are magnetically attracted to each other, and, on an opposite side from the contact surface, the third magnetic body may be movable relative to the guide in a direction of an axis of the cap.

In the first aspect of the present disclosure, the cap may have a flange part that is disposed so as to cover the liquid injection hole and an insert part that is inserted into the liquid injection hole, and a leading end portion of the insert part may have a tapered truncated conical shape.

In the first aspect of the present disclosure, the contact surface with which the top surface of the cap comes in contact may have a protrusion; the top surface of the cap may have a recess; and the protrusion and the recess may be engaged with each other in the state where the first magnetic body and the third magnetic body are magnetically attracted to each other.

In the first aspect of the present disclosure, a guide member may be provided that is disposed so as to face a side surface of the outer case to hold the position of the cap by the magnetic force.

According to the secondary cell manufacturing method described above, it is possible to reduce the likelihood of displacement of the cap that is disposed to cover the liquid injection hole and of disengagement of the cap from the liquid injection hole.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment (Secondary Cell 1)

Figure 1:
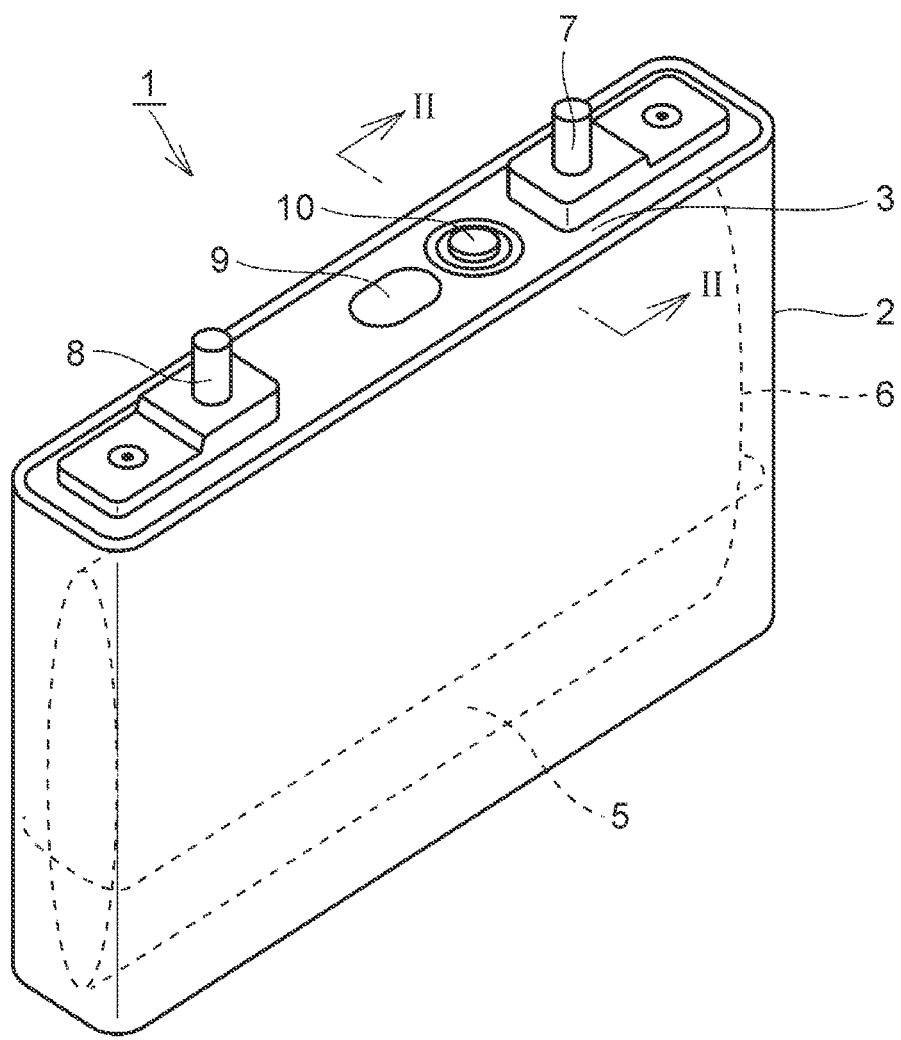
FIG. 1 is a perspective view showing a secondary cell 1 in a first embodiment.
Figure 2:
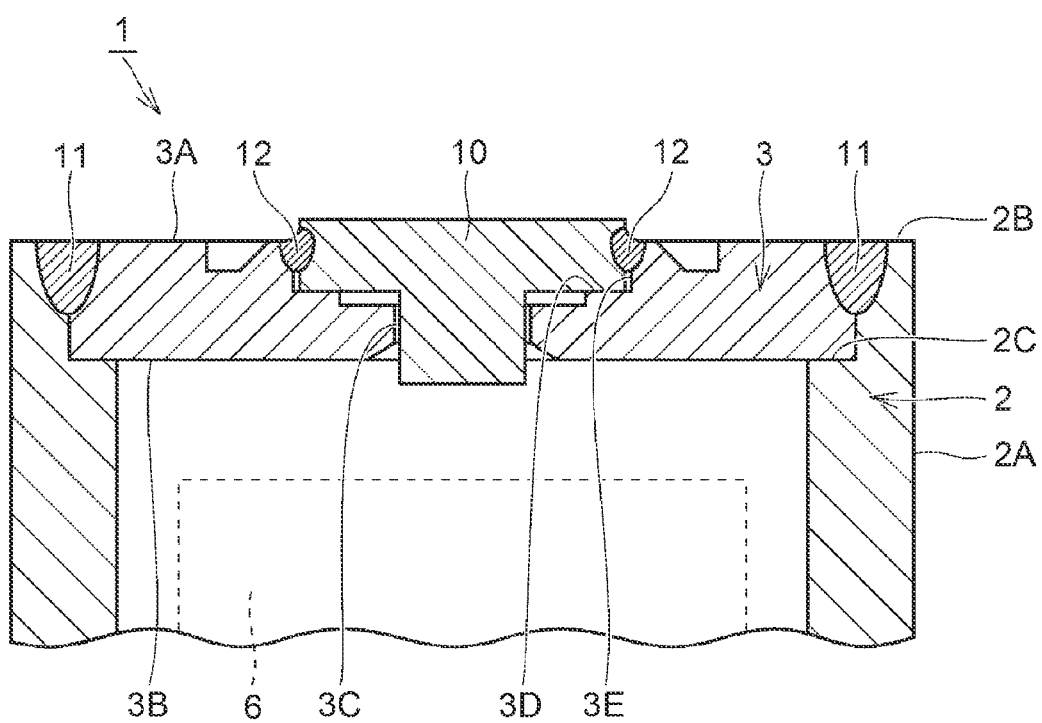
FIG. 2 is a sectional view taken along the line II-II of FIG. 1.

FIG. 1 is a perspective view showing a secondary cell 1 in a first embodiment. FIG. 2 is a sectional view taken along the line II-II of FIG. 1. The secondary cell 1 includes an outer case 2, a lid member 3, an electrolyte solution 5 (see FIG. 1), an electrode 6, terminals 7, 8 (FIG. 1), an explosion protection valve 9 (FIG. 1), and a seal member 10.

As shown in FIG. 2, the outer case 2 includes side surfaces 2A, an upper surface 2B, a step 2C, and an opening 2S (see FIG. 10 and FIG. 13), and has a bottom-closed cylindrical shape as a whole. The lid member 3 has a plate-like shape, and the lid member 3 is made of aluminum, for example. The lid member 3 includes an upper surface 3A, a lower surface 3B, and a liquid injection hole 3C.

Figure 10:
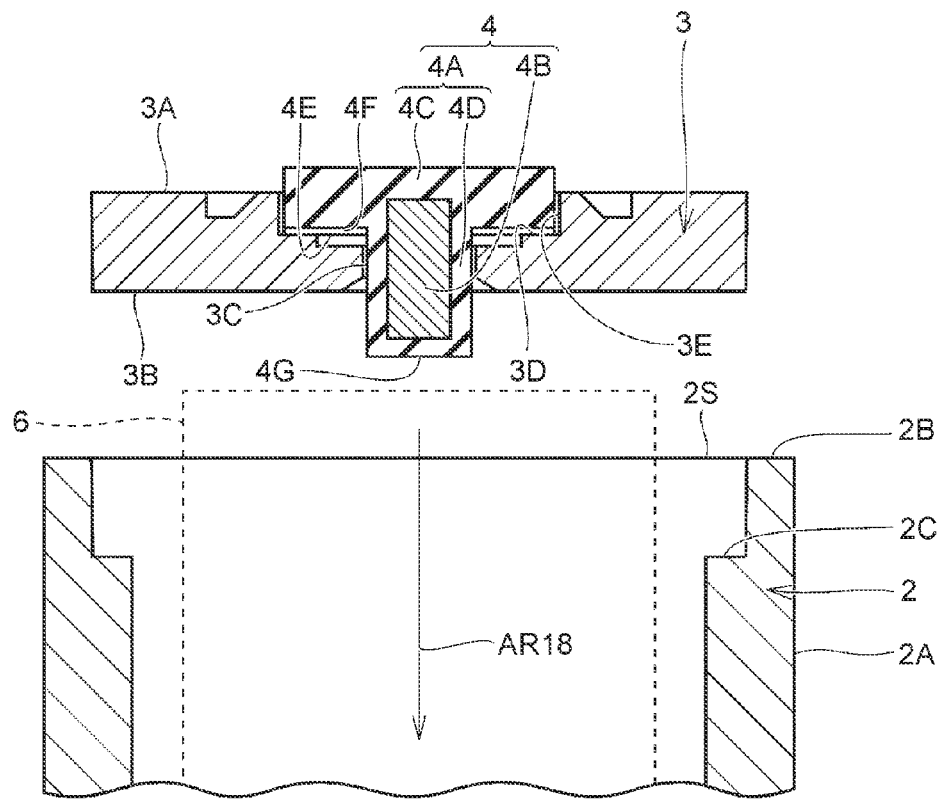
FIG. 10 is a sectional view illustrating the cap disposing step ST1A and a lid member disposing step ST2 of FIG. 3.

As shown in FIG. 2, the lid member 3 is disposed on the step 2C so as to cover the opening 2S (FIG. 10). The lid member 3 is welded to the outer case 2, with an annular weld 11 formed between the outer case 2 and the lid member 3. The outer case 2 and the lid member 3 constitute an outer shell of the secondary cell 1, and the electrolyte solution 5 and the electrode 6 are disposed inside the outer shell.

The electrode 6 includes: a winding having a positive electrode sheet, a negative electrode sheet, and a separator; a positive electrode collection part connected to one end of the winding; and a negative electrode collection part connected to the other end of the winding. The terminals 7, 8 (FIG. 1) protrude from the upper surface 3A (FIG. 2) of the lid member 3, and are respectively electrically connected to the positive electrode collection part and the negative electrode collection part of the electrode 6.

The explosion protection valve 9 is provided in a plate-like portion of the lid member 3. The explosion protection valve 9 is actuated when the pressure inside the outer shell has become higher or lower than a predetermined value. The seal member 10 seals the liquid injection hole 3C. The seal member 10 is welded to the lid member 3, with an annular weld 12 formed between the outer case 2 and the lid member 3 (inner wall surface 3E).

(Manufacturing Method of Secondary Cell 1)

Figure 3:
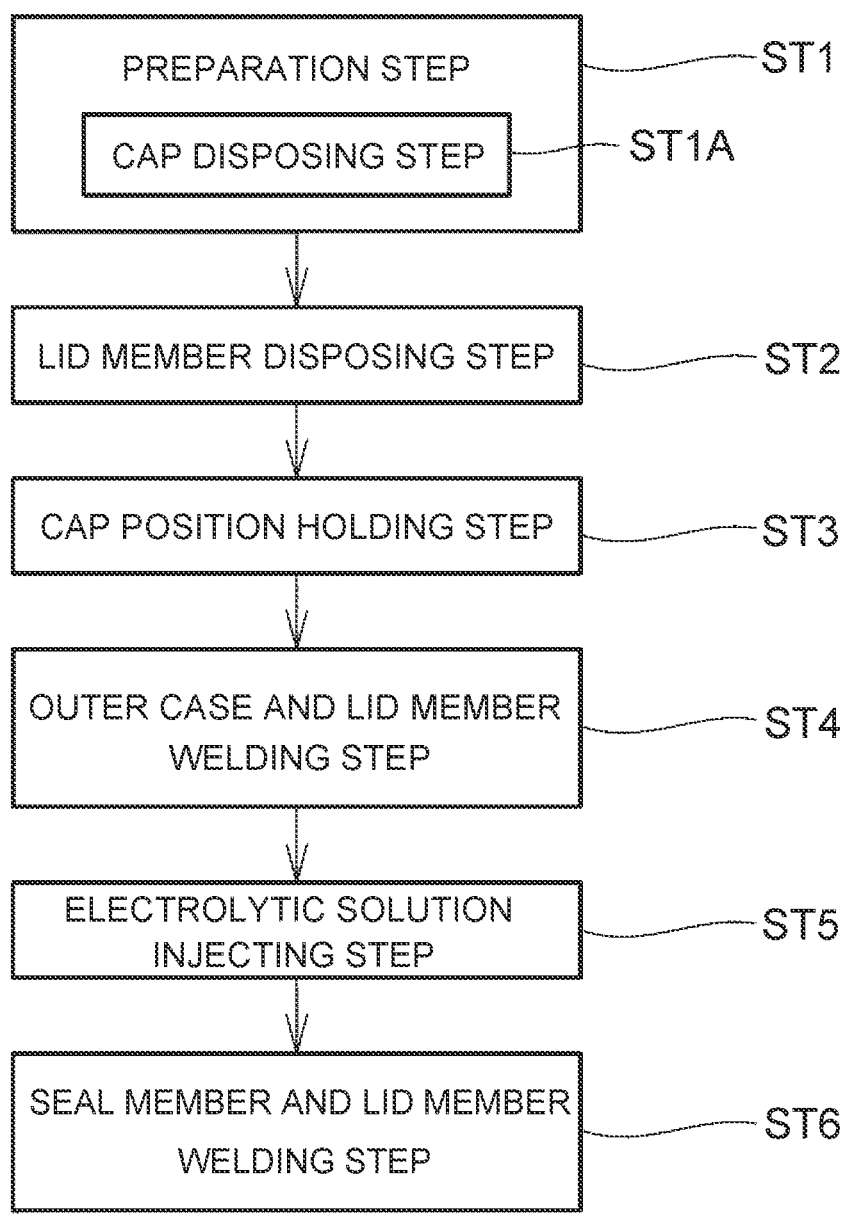
FIG. 3 is a flowchart showing a manufacturing method of the secondary cell 1 in the first embodiment.

FIG. 3 is a flowchart showing a manufacturing method of the secondary cell 1. In the manufacturing method of the secondary cell 1, a preparation step ST1, a lid member disposing step ST2, a cap position holding step ST3, a welding step ST4, an electrolyte solution injecting step ST5, and a welding step ST6 are performed.

(Preparation Step ST1)

Figure 4:
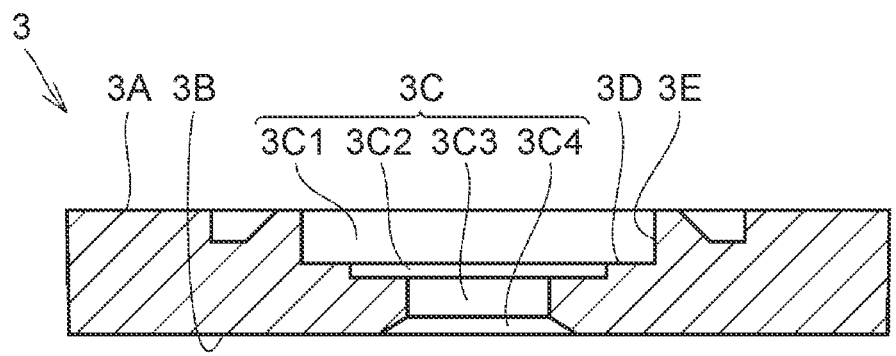
FIG. 4 is a sectional view showing a lid member 3 prepared in a preparation step ST1 of FIG. 3.

FIG. 4 is a sectional view showing the lid member 3 prepared in the preparation step ST1. The sectional shape of the lid member 3 shown in FIG. 4 corresponds to the sectional shape of the lid member 3 shown in FIG. 2. The liquid injection hole 3C of the lid member 3 includes recesses 3C1, 3C2, a perforated part 3C3, and a large-diameter part 3C4. The recess 3C1 has a bottom surface 3D and the inner wall surface 3E. The recess 3C2 has a smaller open area than the recess 3C1, and the perforated part 3C3 has a smaller open area than the recess 3C2.

Figure 5:
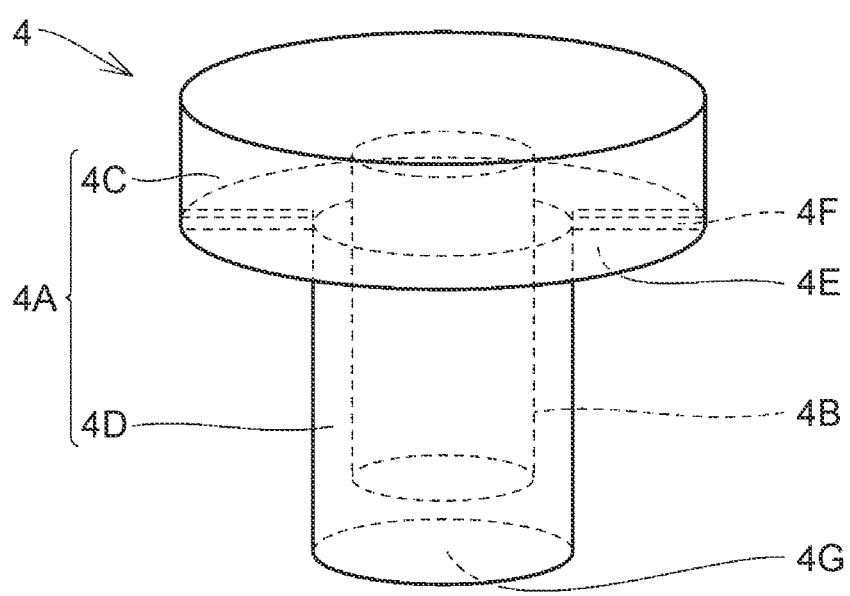
FIG. 5 is a perspective view showing a cap 4 prepared in the preparation step ST1 of FIG. 3.
Figure 6:
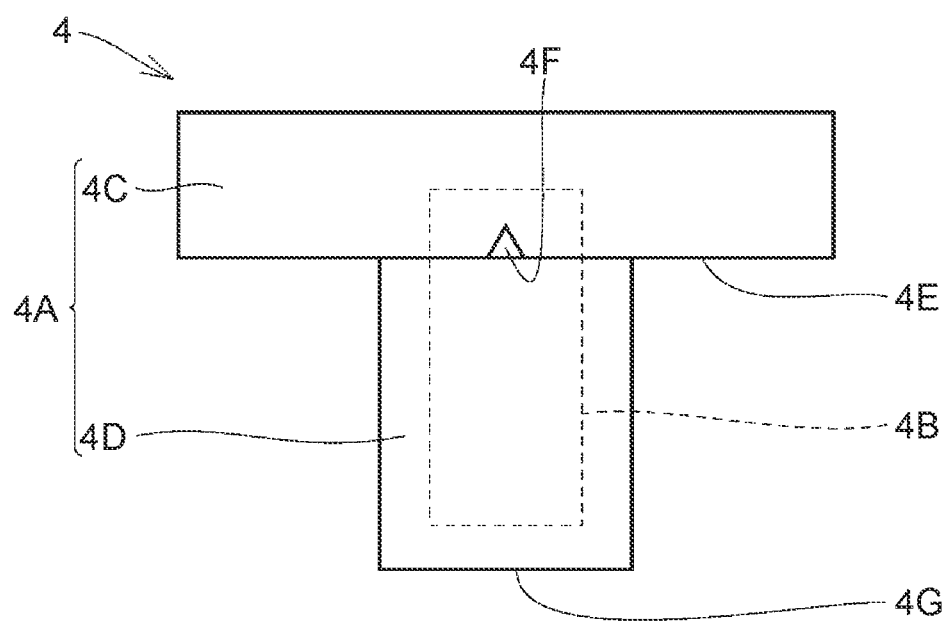
FIG. 6 is a side view showing the cap 4 prepared in the preparation step ST1 of FIG. 3.

FIG. 5 and FIG. 6 are a perspective view and a side view, respectively, showing a cap 4 prepared in the preparation step ST1. The cap 4 includes a resin member 4A and a first magnetic body 4B. The resin member 4A has the first magnetic body 4B embedded inside. The resin member 4A is made of perfluoro-alkoxyfluoro plastics (PFA), for example. As long as the cap 4 has the first magnetic body 4B embedded inside, the cap 4 may include another member that is not made of resin instead of the resin member 4A.

The resin member 4A includes a flange part 4C and an insert part 4D. The flange part 4C has a flattened columnar shape. The insert part 4D has a columnar shape with a diameter smaller than that of the flange part 4C. The insert part 4D is provided so as to hang down from a bottom surface 4E of the flange part 4C. A leading end portion 4G of the insert part 4D has a flat planar shape. The bottom surface 4E is provided with recessed grooves 4F that extend in the direction of the radius of the flange part 4C. One end of the recessed groove 4F reaches a position in the outer circumferential surface of the flange part 4C, and the other end of the recessed groove 4F reaches a position in the outer circumferential surface of the insert part 4D. In a direction perpendicular to the bottom surface 4E, the height of the recessed groove 4F is 50 μm, for example. In a direction parallel to the bottom surface 4E and perpendicular to the direction of extension of the recessed groove 4F, the width of the recessed groove 4F is 50 μm, for example.

The first magnetic body 4B has a columnar shape and is embedded inside the resin member 4A. The first magnetic body 4B is made of Fe, SUS430, or the like. The first magnetic body 4B may be a magnet (neodymium etc.). In the case where the first magnetic body 4B is a magnet, the position, posture, etc. of the first magnetic body 4B inside the cap 4 are set according to the configuration of second magnetic bodies 32, 34 (FIG. 12) and a third magnetic body 22 (FIG. 8), to be described later, such that the first magnetic body 4B can be magnetically attracted to the second magnetic bodies 32, 34 or the third magnetic body 22.

Figure 7:
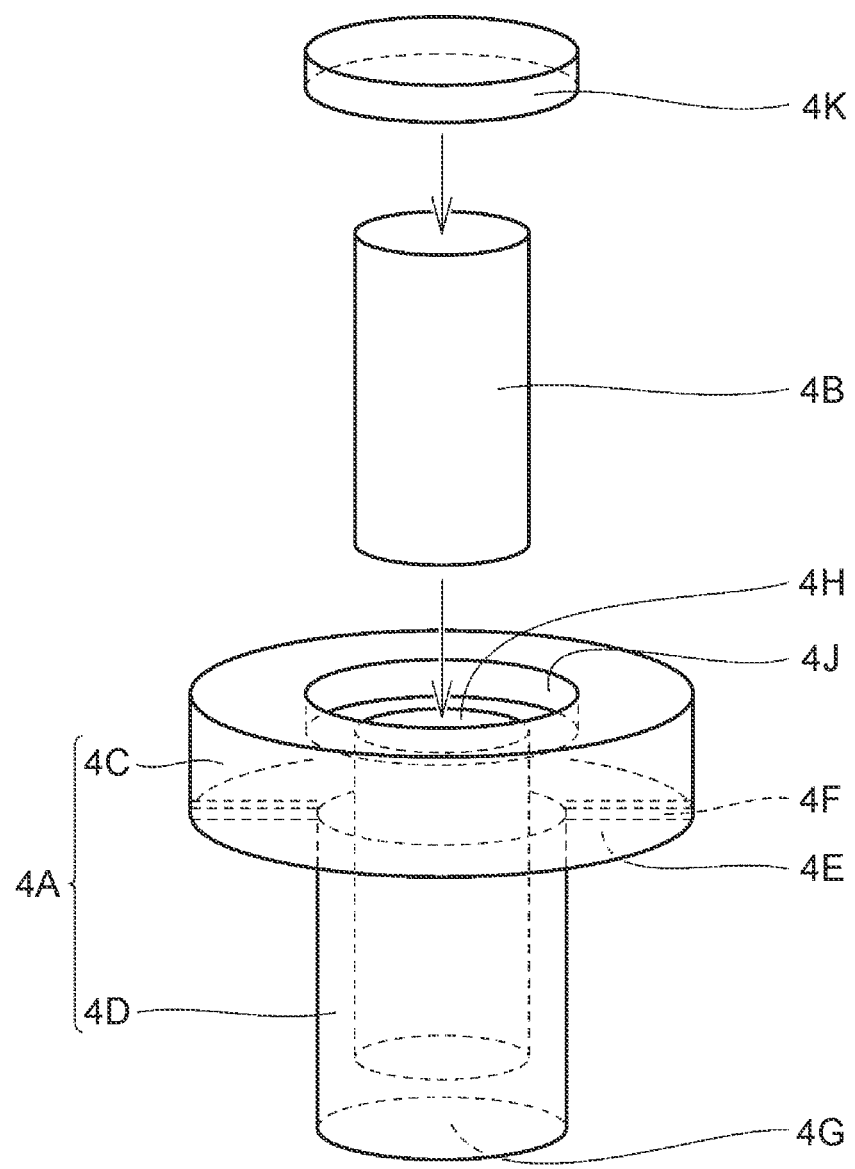
FIG. 7 is a perspective view showing a manufacturing method of the cap 4 prepared in the preparation step ST1 of FIG. 3.

Referring to FIG. 7, the cap 4 can be produced by the following technique. The resin member 4A, the first magnetic body 4B, and a sheet 4K are prepared. The resin member 4A and the sheet 4K are made of PFA, for example. The resin member 4A is provided with recesses 4J, 4H. After the magnetic body 4B is inserted into the recess 4H, the sheet 4K is disposed inside the recess 4J. The cap 4 as shown in FIG. 5 can be obtained as the sheet 4K is deposited on the resin member 4A.

(Cap Disposing Step ST1A)

Figure 8:
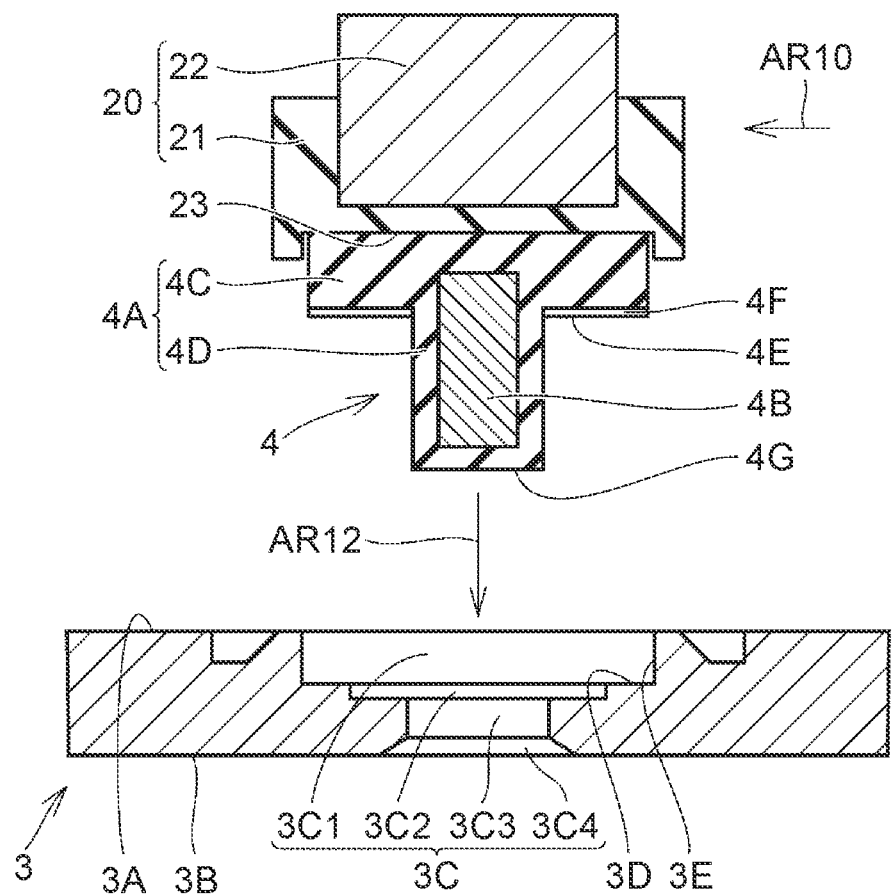
FIG. 8 is a sectional view showing a first stage of a cap disposing step ST1A of FIG. 3.

Referring to FIG. 3 and FIG. 8, the preparation step ST1 includes a cap disposing step ST1A. In the cap disposing step ST1A, the cap 4 is disposed so as to cover the liquid injection hole 3C provided in the lid member 3. The cap 4 is transferred by a transfer mechanism 20.

The transfer mechanism 20 includes a guide 21 and the third magnetic body 22. The guide 21 has a contact surface 23. The contact surface 23 can come in contact with the top surface of the flange part 4C. The third magnetic body 22 is provided on the opposite side of the guide 21 from the contact surface 23. The third magnetic body 22 is movable relative to the guide 21 in the axial direction (upper-lower direction in the sheet of FIG. 8) (see FIG. 9).

The transfer mechanism 20 holds the cap 4 using a magnetic attractive force acting between the first magnetic body 4B and the third magnetic body 22. The magnetic attractive force acting between the third magnetic body 22 and the first magnetic body 4B acts in the direction of attracting the cap 4 toward the position of the third magnetic body 22. This magnetic attractive force not only acts as a force that attracts the cap 4 in the height direction but also acts as a force that attracts (moves) the cap 4 in the plane direction.

Accordingly, when friction between the resin member 4A and the contact surface 23 is small, it is also possible to position (center) the cap 4 relative to the guide 21 using the magnetic attractive force. The transfer mechanism 20, while holding the cap 4, moves until reaching a position directly above the liquid injection hole 3C (arrow AR10). While the transfer mechanism 20 is transferring the cap 4, the first magnetic body 4B and the third magnetic body 22 are magnetically attracted to each other. Then, the transfer mechanism 20 moves downward (arrow AR12). The cap 4 is disposed so as to cover the liquid injection hole 3C. As long as the cap 4 can cover the liquid injection hole 3C, the cap 4 may be composed of only the flange part 4C and the insert part 4D may be omitted.

Figure 9:
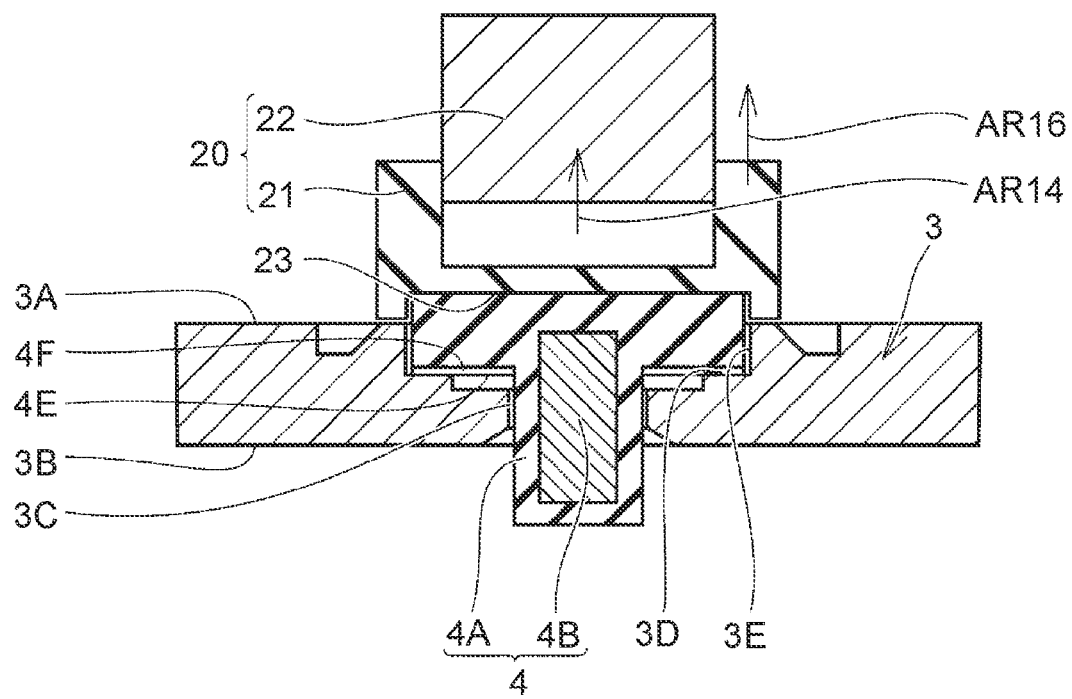
FIG. 9 is a sectional view showing a second stage of the cap disposing step ST1A of FIG. 3.

Referring to FIG. 9, the third magnetic body 22 moves upward so as to separate from the contact surface 23 (arrow AR14), so that the cap 4 is released from the attraction toward the contact surface 23. Then, the guide 21 moves upward (arrow AR16), so that the guide 21 is separated from the cap 4. Using the magnetic attractive force acting between the first magnetic body 4B and the third magnetic body 22, the transfer mechanism 20 can quickly and easily attach and detach the cap 4 to and from the liquid injection hole 3C.

Referring to FIG. 1 and FIG. 10, after the cap 4 is disposed so as to cover the liquid injection hole 3C, the terminal 7 (FIG. 1) provided on the lid member 3 and the positive electrode collection part of the electrode 6 are electrically connected to each other using a positive electrode collector. The terminal 8 (FIG. 1) provided on the lid member 3 and the negative electrode collection part of the electrode 6 are electrically connected to each other using a negative electrode collector. The lid member 3 and the electrode 6 are shown at a distance from each other in FIG. 10, but actually the lid member 3 and the electrode 6 are integrated through the positive electrode collector and the negative electrode collector (neither is shown).

(Lid Member Disposing Step ST2)

Referring to FIG. 3 and FIG. 10, in the lid member disposing step ST2, the lid member 3 integrated with the electrode 6 is disposed on the step 2C so as to cover the opening 2S. Accordingly, the electrode 6 is inserted through the opening 2S into the outer case 2 (see the arrow AR18).

(Cap Position Holding Step ST3)

Figure 11:
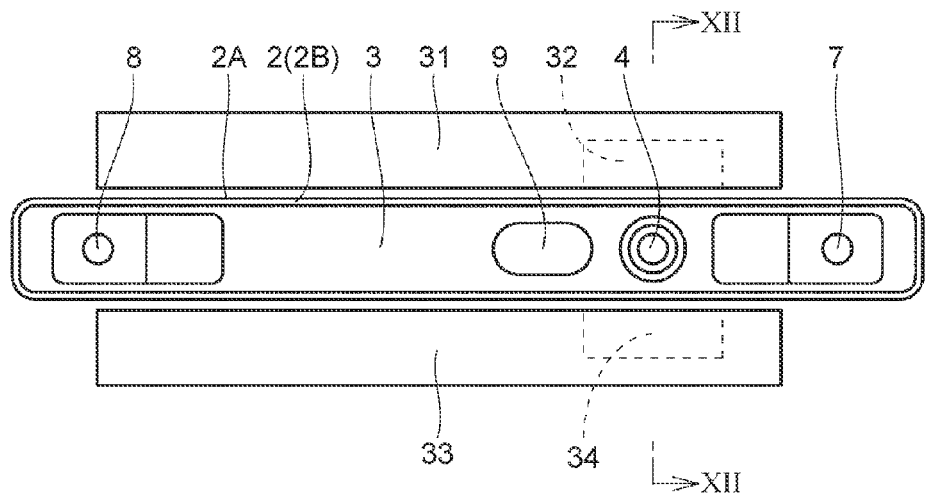
FIG. 11 is a plan view showing a cap position holding step ST3 of FIG. 3.
Figure 12:
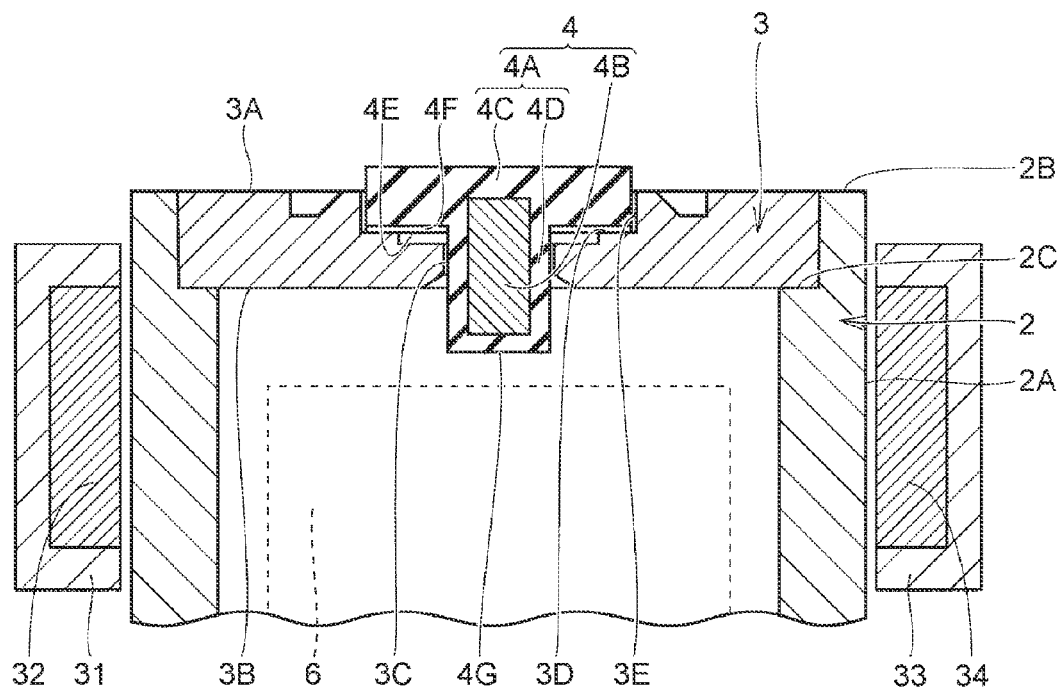
FIG. 12 is a sectional view taken along the line XII-XII of FIG. 11.

FIG. 11 is a plan view showing the cap 4 etc. while the cap position holding step ST3 is in progress. FIG. 12 is a sectional view taken along the line XII-XII of FIG. 11. In the state where the cap 4 is disposed so as to cover the liquid injection hole 3C, the flange part 4C of the cap 4 is disposed so as to cover the liquid injection hole 3C from the upper side of the liquid injection hole 3C, while the insert part 4D of the cap 4 is inserted inside the liquid injection hole 3C.

Guide members 31, 33 respectively have the magnetic bodies 32, 34 (second magnetic bodies) embedded inside. After the cap 4 is disposed so as to cover the liquid injection hole 3C, the guide members 31, 33 are disposed on opposite outer sides of the outer case 2. The second magnetic bodies 32, 34 are magnets (neodymium etc.) that can be magnetically attracted to the first magnetic body 4B. Alternatively, only one of the second magnetic bodies 32, 34 may be used. The second magnetic bodies 32, 34 may be electromagnets.

In the cap position holding step ST3, as the guide members 31, 33 are moved, the first magnetic body 4B and the second magnetic bodies 32, 34 that apply a magnetic force (in this example, a magnetic attractive force) to the first magnetic body 4B are brought close to each other. The guide members 31, 33 are disposed on the opposite outer sides of the outer case 2. The second magnetic bodies 32, 34 are disposed so as to face the side surfaces 2A of the outer case 2.

The position of the cap 4 that is disposed to cover the liquid injection hole 3C is held with high accuracy by the magnetic force (magnetic attractive force) applied from the second magnetic bodies 32, 34 through the side surfaces 2A to the first magnetic body 4B. Thus, the likelihood of displacement of the cap 4 that is disposed to cover the liquid injection hole 3C and of disengagement of the cap 4 from the liquid injection hole 3C is reduced.

Figure 13:
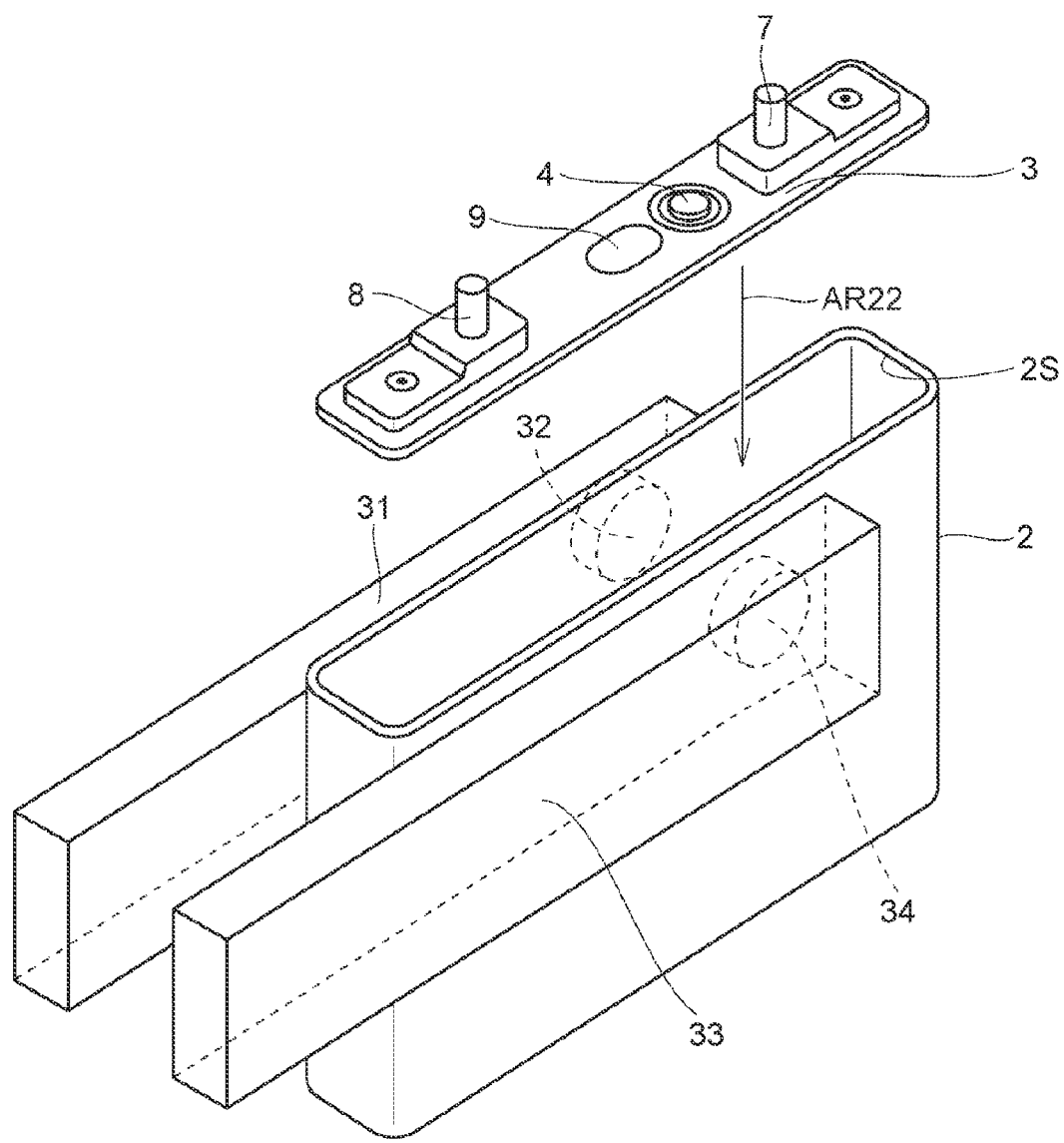
FIG. 13 is a perspective view showing a modified example of the lid member disposing ST2 and the cap position holding step ST3 of FIG. 3.

As shown in FIG. 13, the guide members 31, 33 may be disposed in advance on the opposite outer sides of the outer case 2. In this case, the lid member disposing step ST2 (FIG. 2, FIG. 10) is performed (arrow AR22) after the guide members 31, 33 are disposed on the opposite outer sides of the outer case 2. For convenience of illustration, the electrode 6, the positive electrode collector, the positive electrode collection part, etc. are not shown in FIG. 13.

As the lid member 3 and the cap 4 are moved, the first magnetic body 4B and the second magnetic bodies 32, 34 that apply a magnetic force (in this example, a magnetic attractive force) to the first magnetic body 4B are brought close to each other. As the lid member 3 integrated with the electrode 6 is disposed on the step 2C so as to cover the opening 2S, the position of the cap 4 that is disposed to cover the liquid injection hole 3C is held by the magnetic force applied from the second magnetic bodies 32, 34 to the first magnetic body 4B. Thus, even when the disposing steps are performed in this order, the likelihood of displacement of the cap 4 that is disposed to cover the liquid injection hole 3C and of disengagement of the cap 4 from the liquid injection hole 3C is reduced.

(Welding Step ST4)

Figure 14:
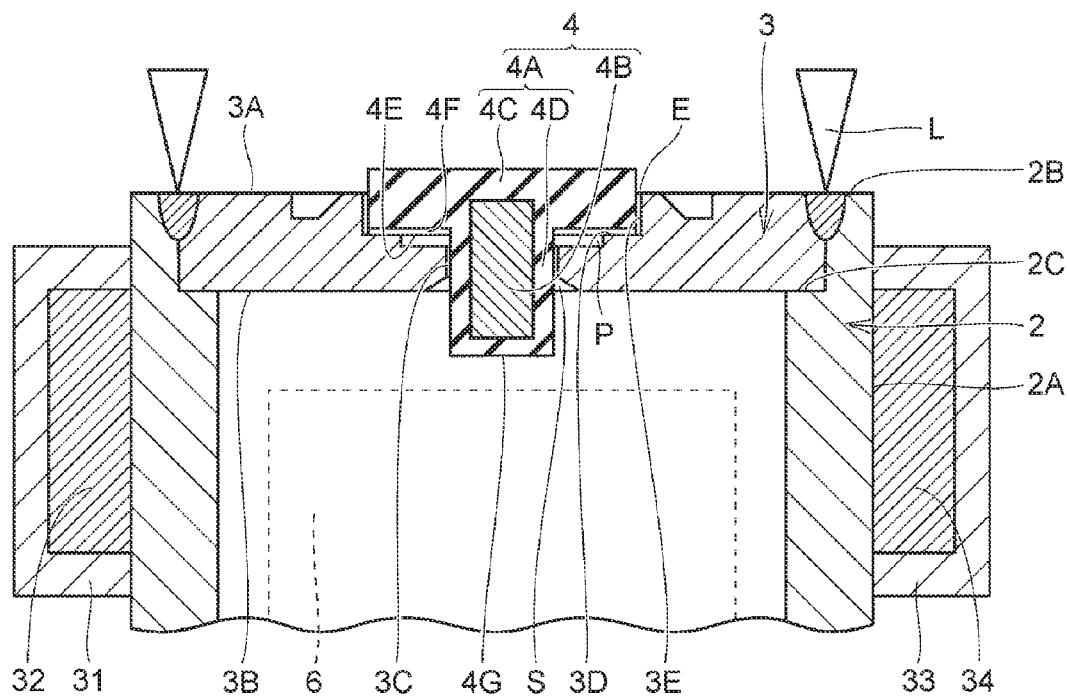
FIG. 14 is a sectional view showing a welding step ST4 of FIG. 3.

Referring to FIG. 3 and FIG. 14, in the state where the position of the cap 4 is held by the magnetic force, the gap between the outer case 2 and the lid member 3 is irradiated with a laser L. The lid member 3 is welded to the outer case 2. While the lid member 3 is welded to the outer case 2, the cap 4 is disposed so as to cover the liquid injection hole 3C and blocks the liquid injection hole 3C. During welding, the cap 4 prevents welding spatter (metal such as aluminum or a metallic compound such as aluminum oxide) from entering inside the outer case 2 through the liquid injection hole 3C.

As shown in FIG. 14, in the state where the position of the cap 4 is held by the magnetic force, the flange part 4C of the cap 4 is disposed so as to face a portion (bottom surface 3D)

of the lid member 3 around the liquid injection hole 3C. While the lid member 3 is welded to the outer case 2, a communication path P that allows communication between the inside and the outside of the outer case 2 is formed between the portion (bottom surface 3D) of the lid member 3 around the liquid injection hole 3C and the flange part 4C of the cap 4.

(Electrolyte Solution Injecting Step ST5)

Referring to FIG. 1 and FIG. 3 again, after the lid member 3 is welded to the outer case 2, the liquid injection hole 3C is revealed to inject the electrolyte solution 5 (FIG. 1) through the liquid injection hole 3C into the outer case 2. Thereafter, initial charging, gas venting, etc. are performed.

(Welding Step ST6)

Referring to FIG. 1 to FIG. 3, the seal member 10 is disposed so as to cover the liquid injection hole 3C. The liquid injection hole 3C is sealed as the seal member 10 is welded to the lid member 3. The secondary cell 1 shown in FIG. 1 and FIG. 2 is obtained as a result of performing the above steps.

(Workings and Effects)

As described at the beginning, an external force due to vibration, wind pressure, etc. is likely to act on the cap 4 while the lid member 3 is welded to the outer case 2. In this embodiment, the position of the cap 4 that is disposed to cover the liquid injection hole 3C is held with high accuracy by the magnetic force applied from the second magnetic bodies 32, 34 to the first magnetic body 4B. It is almost unlikely that the cap 4 that is disposed to cover the liquid injection hole 3C is displaced or that the cap 4 is disengaged from the liquid injection hole 3C. It is also almost unlikely that foreign substances, such as welding spatter, enter inside the outer case 2 through the liquid injection hole 3C. Thus, short-circuit, a decrease in output, etc. resulting from entry of foreign substances into the outer case 2 are effectively prevented.

The position of the cap 4 that is disposed to cover the liquid injection hole 3C is held by the magnetic attraction between the first magnetic body 4B and the second magnetic bodies 32, 34 that are disposed to face the side surfaces 2A of the outer case 2. Since the second magnetic bodies 32, 34 are not disposed on the upper side of the outer case 2 and the lid member 3, a laser head etc. can be easily disposed on the upper side of the outer case 2 and the lid member 3.

In this embodiment, the second magnetic bodies 32, 34 are incorporated in the members that position and transfer the outer case 2, i.e., the guide members 31, 33 (chuck) that grasp the outer case 2. According to this configuration, a magnetic force can be easily applied from the second magnetic bodies 32, 34 through the side surfaces 2A to the first magnetic body 4B as the outer case 2 is positioned or transferred.

As described at the beginning, it is not only during welding of the lid member 3 to the outer case 2 that displacement, fall, etc. of the cap 4 can occur. Displacement, fall, etc., of the cap 4 can also occur, for example, when a place where the welding step ST4 is performed is a long distance away from a place where the lid member disposing step ST2 is performed or a place where the cap position holding step ST3 is performed. An external force due to vibration etc. may act on the cap 4 while the outer case 2, the lid member 3, and the cap 4 are transferred to the place where the welding step ST4 is performed. According to this embodiment, even during this transfer, the position of the cap 4 that is disposed to cover the liquid injection hole 3C can be held by the magnetic force applied from the second magnetic bodies 32, 34 to the first magnetic body 4B. Even during the transfer, it is almost unlikely that the cap 4 covering the liquid injection hole 3C is displaced or that the cap 4 is disengaged from the liquid injection hole 3C.

As described above, while the lid member 3 is welded to the outer case 2, the communication path P that allows communication between the inside and the outside of the outer case 2 is formed between the portion (bottom surface 3D) of the lid member 3 around the liquid injection hole 3C and the flange part 4C of the cap 4. Even if the pressure inside the outer case 2 has risen due to welding heat during welding, gas inside the outer case 2 is discharged to the outside through a clearance S between the liquid injection hole 3C (the large-diameter part 3C4, the perforated part 3C3, the recess 3C2) and the cap 4, the communication path P, and a clearance E between the liquid injection hole 3C (recess 3C1) and the cap 4. To discharge the internal gas, the internal gas can be discharged through the clearance S, the communication path P, and the liquid injection hole 3C, so that it is almost unlikely that the cap 4 covering the liquid injection hole 3C is lifted (displaced) or that the cap 4 is disengaged from the liquid injection hole 3C.

In this embodiment, the communication path P is formed between the portion (bottom surface 3D) of the lid member 3 around the liquid injection hole 3C and the flange part 4C of the cap 4 by providing the recessed grooves 4F in the flange part 4C (bottom surface 4E) of the cap 4. However, the communication path P is not limited to this configuration; the communication path P may be formed by providing a recessed groove in the portion (bottom surface 3D) of the lid member 3 around the liquid injection hole 3C without providing the recessed grooves 4F in the flange part 4C (bottom surface 4E) of the cap 4, or the communication path P may be formed by providing a recessed groove in both of the flange part 4C (bottom surface 4E) of the cap 4 and the portion (bottom surface 3D) of the lid member 3 around the liquid injection hole 3C.

In this embodiment, the cap 4 is composed of the resin member 4A and the first magnetic body 4B embedded inside the resin member 4A. Since the resin member 4A (PFA etc.) is sufficiently softer than the lid member 3 made of metal (aluminum etc.), it is almost unlikely that the cap 4 damages the inner circumferential surface of the liquid injection hole 3C while the cap 4 is attached to or detached from the liquid injection hole 3C. Moreover, it is possible to bring the bottom surface 4E of the flange part 4C in close contact with the bottom surface 3D when disposing the cap 4 so as to cover the liquid injection hole 3C.

A resin material, such as PFA, has such a coefficient of surface friction that foreign substances (welding spatter, resin fragments, etc.) that can be generated in a common secondary cell manufacturing method are less likely to adhere to the resin material. Accordingly, using a resin material, such as PFA, as the resin member 4A of the cap 4 can prevent adhesion of foreign substances to the cap 4 itself. On the other hand, a resin material, such as PFA, has high resistance to a liquid solvent that can be used to clean a resin material. By using a resin material, such as PFA, as the resin member 4A of the cap 4, one can clean the cap 4 and repeatedly use the cap 4.

Unlike resin materials, such as polyetheretherketone (PEEK) and polyphenylene sulfide (PPS), a resin material, such as PFA, allows the laser L used in the welding step ST4 to pass through the resin material at high transmission rate. During the welding step ST4, the cap 4 may be irradiated with reflected light of the laser L due to a reflection effect. By using a resin material, such as PFA, as the resin member 4A of the cap 4, one can prevent melting or burning of the cap 4 even if the cap 4 receives reflected light of the laser L while the welding step ST4 is performed.

As described above, the transfer mechanism 20 having the guide 21 and the third magnetic body 22 is used. The transfer mechanism 20 uses the magnetic attractive force acting between the first magnetic body 4B and the third magnetic body 22 to hold the cap 4. As the third magnetic body 22 moves upward in the direction away from the guide 21, the cap 4 is released from the attraction toward the contact surface 23. Then, as the guide 21 moves upward, the guide 21 is separated from the cap 4. By using the magnetic attractive force acting between the first magnetic body 4B and the third magnetic body 22, the transfer mechanism 20 can quickly and easily attach and detach the cap 4 to and from the liquid injection hole 3C without employing a configuration in which the guide 21 grasps or clamps the cap 4.

In this embodiment, the pair of second magnetic bodies 32, 34 are disposed so as to be located on the opposite sides of the outer case 2. The second magnetic bodies 32, 34 face each other across the outer case 2, and magnetic flux is formed between the second magnetic bodies 32, 34. Disposed inside the flux lines, the first magnetic body 4B can receive a magnetic force that attracts the first magnetic body 4B evenly toward the second magnetic body 32 and the second magnetic body 34.

Figure 15:
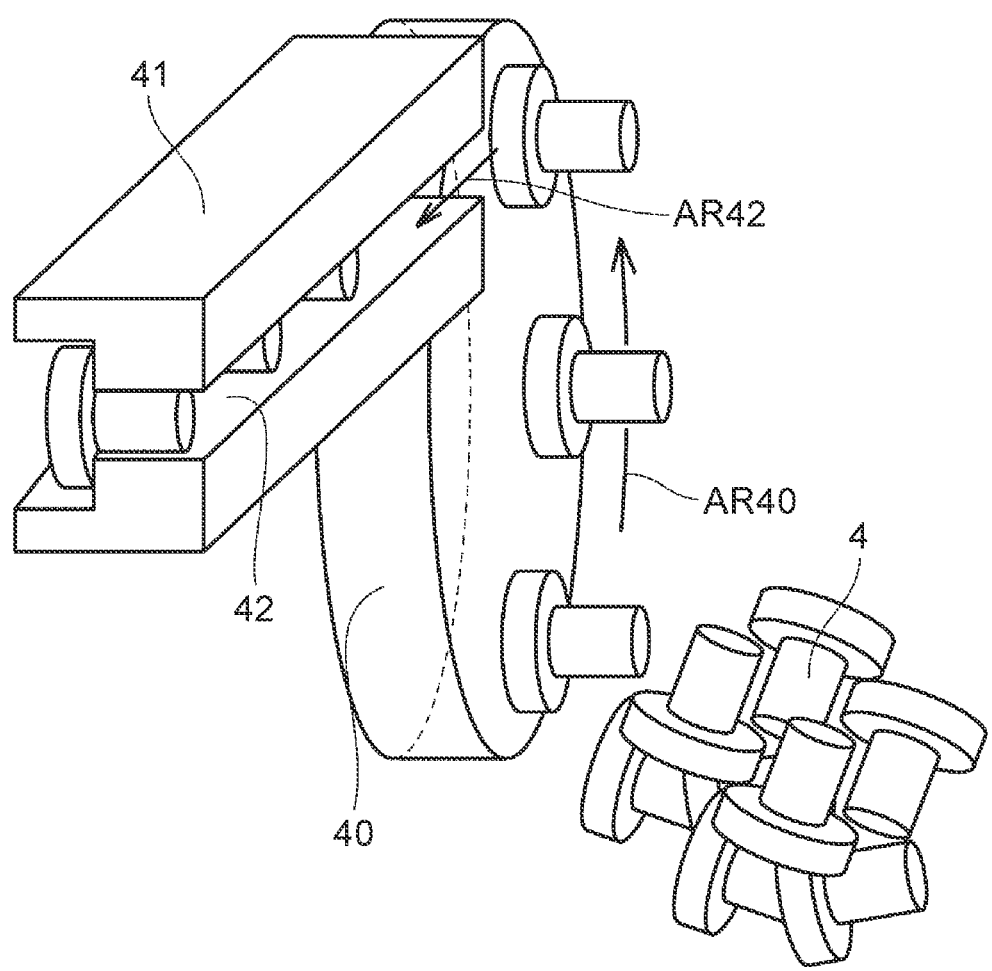
FIG. 15 is a perspective view illustrating one of effects of the manufacturing method of the secondary cell 1 in the first embodiment.

Referring to FIG. 15, if a rotating body 40 that can be magnetically attracted to the first magnetic body 4B is used, the caps 4 having the first magnetic body 4B embedded inside can be easily aligned at predetermined positions. An alignment jig 41 is provided with a path 42. The rotating body 40 picks up the caps 4 by magnetic attraction. The rotating body 40 can send the caps 4 into the path 42 by rotating in the direction of an arrow AR40. This configuration can be used in the preparation step ST1 (FIG. 1).

Second Embodiment

Figure 16:
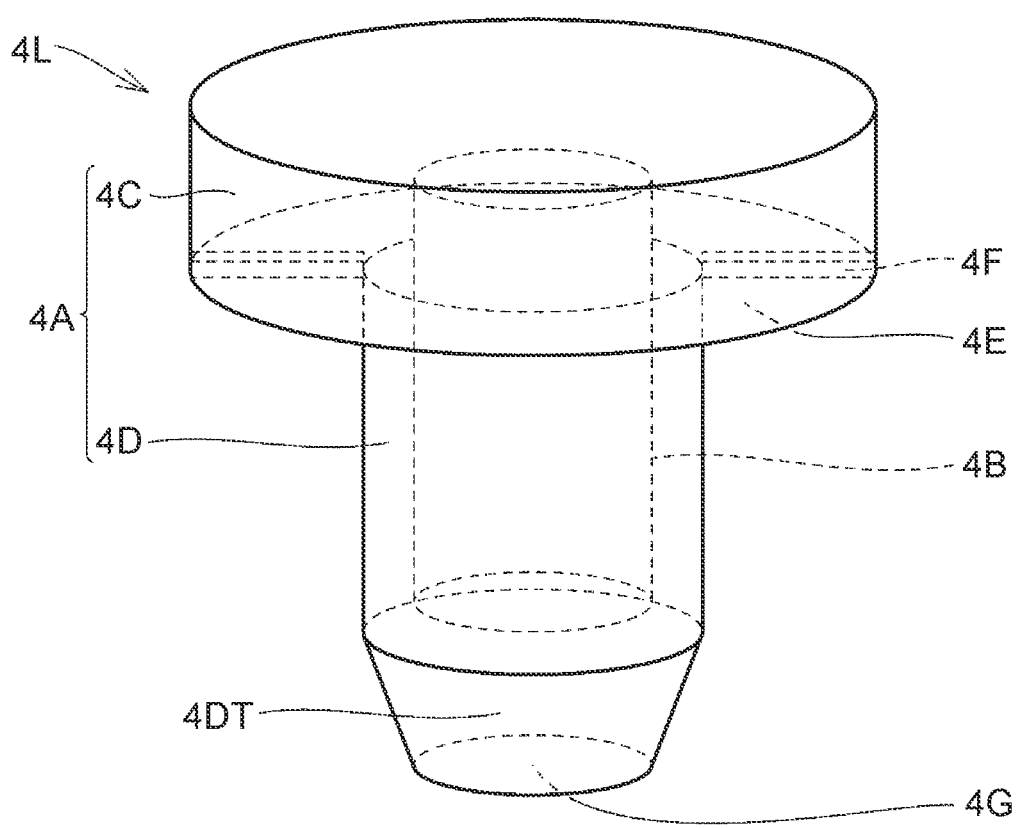
FIG. 16 is a perspective view showing a cap 4L used for a secondary cell manufacturing method in a second embodiment.

A secondary cell manufacturing method in a second embodiment will be described with reference to FIG. 16. Differences between the first embodiment and the second embodiment are as follows. In the second embodiment, a cap 4L is used instead of the cap 4. The insert part 4D of the cap 4L is provided with a tapered portion 4DT. The tapered portion 4DT has a tapered truncated conical shape.

If the tapered portion 4DT is provided, the insert part 4D of the cap 4L can be prevented from hitting the inner circumferential surface of the liquid injection hole 3C while the cap 4L is disposed so as to cover the liquid injection hole 3C. The cap 4L can be prevented from damaging the inner circumferential surface of the liquid injection hole 3C while the cap 4L is inserted into the liquid injection hole 3C.

Third Embodiment

Figure 17:
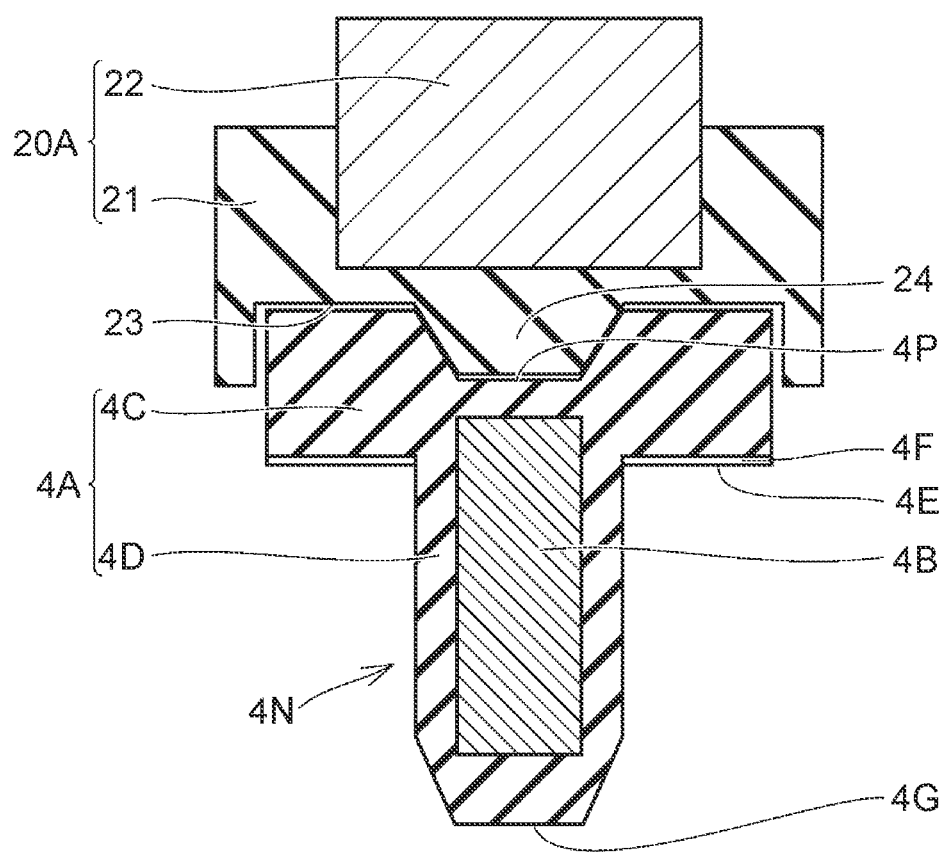
FIG. 17 is a sectional view showing a cap 4N and a transfer mechanism 20A used for a secondary cell manufacturing method in a third embodiment.

A secondary cell manufacturing method in a third embodiment will be described with reference to FIG. 17. Differences between the first embodiment and the third embodiment are as follows. In the third embodiment, a cap 4N and a transfer mechanism 20A are used instead of the cap 4 and the transfer mechanism 20, respectively. A recess 4P is provided on the upper surface side of the flange part 4C of the cap 4N. The contact surface 23 of the transfer mechanism 20A is provided with a protrusion 24.

The recess 4P and the protrusion 24 have shapes corresponding to each other. When the transfer mechanism 20A holds the cap 4N using the magnetic attractive force, the recess 4P and the protrusion 24 are engaged with each other, so that the cap 4N can be positioned (centered) relative to the guide 21 with higher accuracy. This embodiment is not limited to this configuration; the cap 4N may be provided with a protrusion on the upper surface and the contact surface 23 of the transfer mechanism 20A may be provided with a recess having a shape corresponding to the protrusion.

Fourth Embodiment

Figure 18:
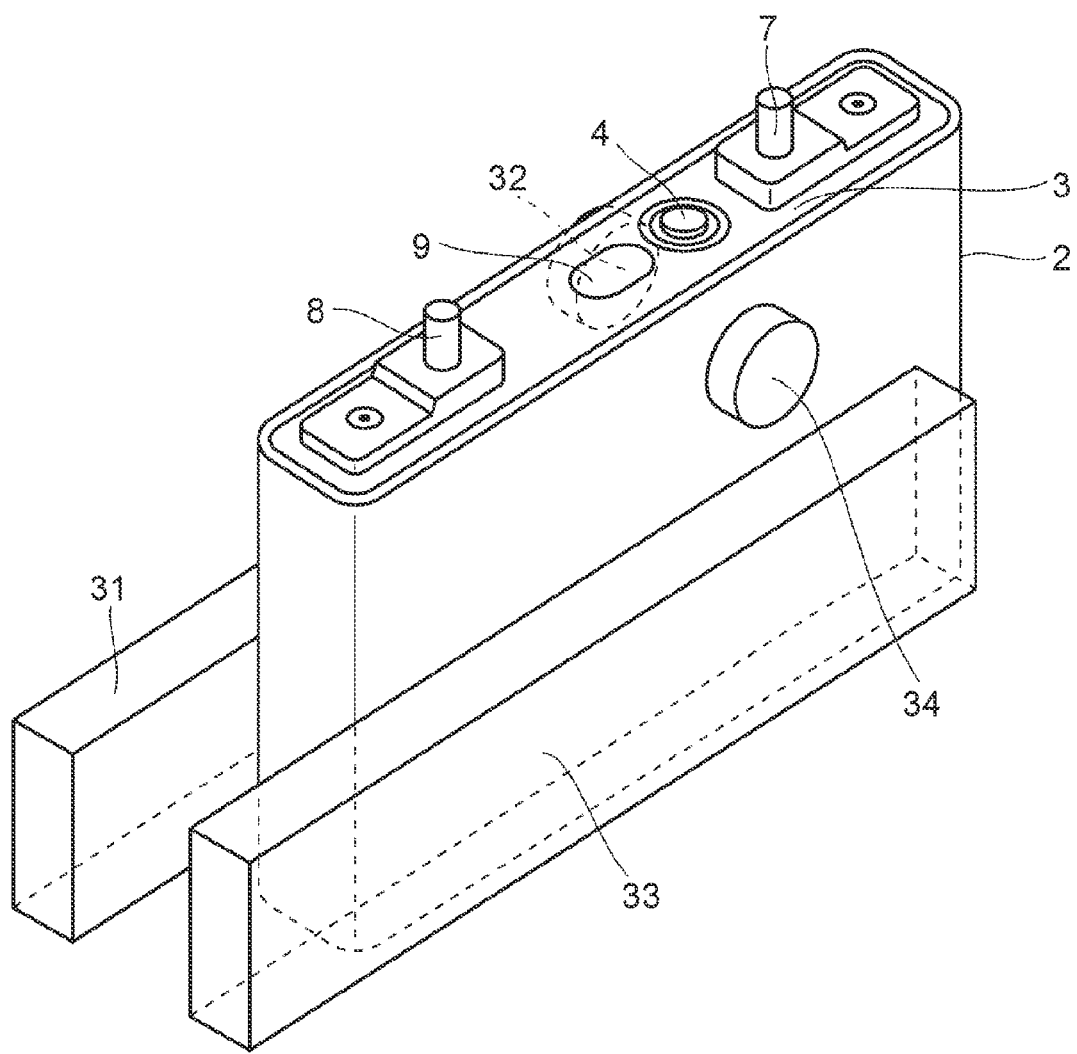
FIG. 18 is a perspective view showing a cap position holding step of a secondary cell manufacturing method in a fourth embodiment.

A secondary cell manufacturing method in a fourth embodiment will be described with reference to FIG. 18. Differences between the first embodiment and the fourth embodiment are as follows. In the first embodiment, the guide members 31, 33 respectively have the second magnetic bodies 32, 34 embedded inside. As shown in FIG. 18, the guide member 31 and the second magnetic body 32 may be separate bodies. The same applies for the guide member 33 and the second magnetic body 34.

If the guide members 31, 33 (chuck) and the second magnetic bodies 32, 34 are configured as separate bodies, it is possible to separate the function of the guide members 31, 33 that grasp the outer case 2, and position and transfer the outer case 2, and the function of the second magnetic bodies 32, 34 that hold the position of the cap 4 covering the liquid injection hole 3C.

Fifth Embodiment

Figure 19:
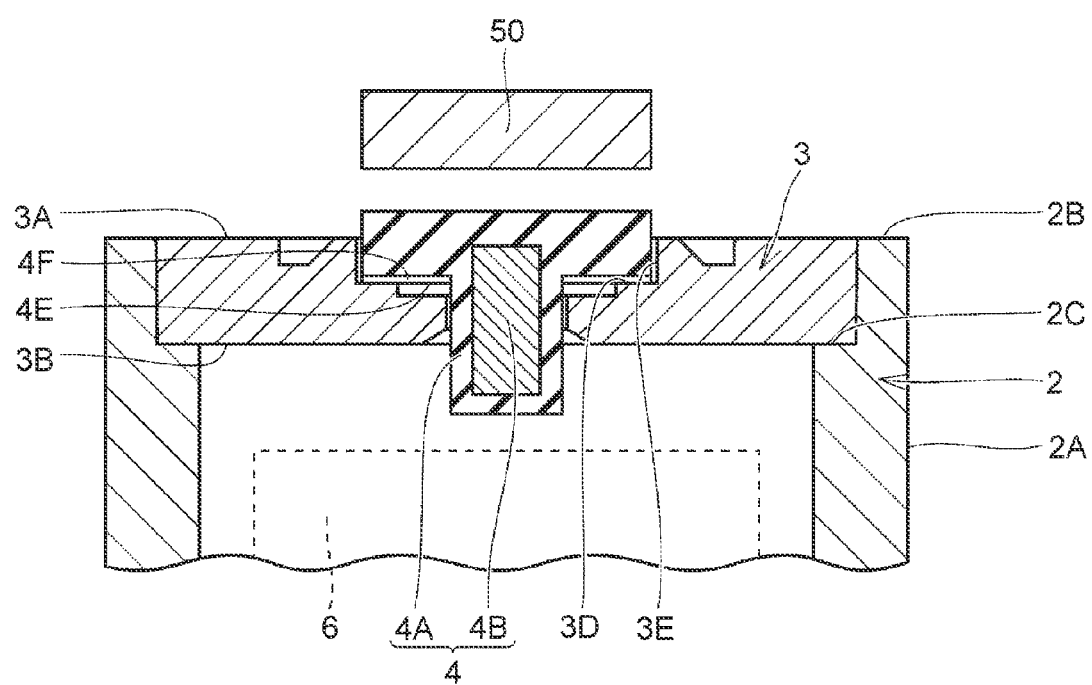
FIG. 19 is a sectional view showing a cap position holding step of a secondary cell manufacturing method in a fifth embodiment.

A secondary cell manufacturing method in a fifth embodiment will be described with reference to FIG. 19. Differences between the first embodiment and the fifth embodiment are as follows. In the cap position holding step ST3 of the first embodiment, the second magnetic bodies 32, 34 are disposed so as to face the side surfaces 2A of the outer case 2, so that the first magnetic body 4B and the second magnetic bodies 32, 34 are magnetically attracted to each other through the side surfaces 2A of the outer case 2. In this case, a magnetic attractive force is used as the magnetic force.

In the fifth embodiment, a magnetic repulsive force is used as the magnetic force. In some cases, a place where the welding step ST4 is performed is a long distance away from a place where the lid member disposing step ST2 is performed or a place where the cap position holding step ST3 is performed. An external force due to vibration etc. may act on the cap 4 while the outer case 2, the lid member 3, and the cap 4 are transferred to the place where the welding step ST4 is performed.

In the fifth embodiment, a magnet 50 as the second magnetic body is used during this transfer. The magnet 50 is neodymium or an electromagnet. For example, the first magnetic body 4B is disposed such that an N-pole is formed on the surface of the first magnetic body 4B that is closer to the magnet 50, and the magnet 50 is configured such that an N-pole is formed on the surface of the magnet 50 that is closer to the cap 4. Thus, a magnetic repulsive force is generated between the N-pole of the first magnetic body 4B and the N-pole of the magnet 50.

Conversely, the first magnetic body 4B may be disposed such that an S-pole is formed on the surface of the first magnetic body 4B that is closer to the magnet 50, and the magnet 50 may be configured such that an S-pole is formed on the surface of the magnet 50 that is closer to the cap 4. The position of the cap 4 that is disposed to cover the liquid injection hole 3C can be held by the magnetic force (magnetic repulsive force) applied from the magnet 50 to the first magnetic body 4B. This configuration can also prevent displacement of the cap 4 that is disposed to cover the liquid injection hole 3C and disengagement of the cap 4 from the liquid injection hole 3C. The magnet 50 that applies a magnetic repulsive force to the first magnetic body 4B can also be used in the welding step ST4 of welding the lid member 3 to the outer case 2.

While the embodiments have been described above, those disclosed above are in every respect merely illustrative and not limitative. Accordingly, the disclosure can be improved and modified in various ways within a range not departing from the scope of the disclosure.

What is claimed is:

1. A secondary cell manufacturing method comprising:
    disposing a cap including a first magnetic body so as to cover a liquid injection hole provided in a lid member;
    disposing the lid member so as to cover an opening of an outer case; and
    bringing close to each other the first magnetic body and a second magnetic body that applies a magnetic force to the first magnetic body, such that a position of the cap that is disposed to cover the liquid injection hole is held by the magnetic force between the first magnetic body and the second magnetic body.

2. The secondary cell manufacturing method according to claim 1, wherein
    when the position of the cap is held by the magnetic force, the second magnetic body is disposed so as to face a side surface of the outer case, so that the first magnetic body and the second magnetic body are magnetically attracted to each other through the side surface of the outer case.

3. The secondary cell manufacturing method according to claim 1, further comprising:
    welding the lid member to the outer case, wherein
    the lid member is welded to the outer case in a state where the position of the cap is held by the magnetic force.

4. The secondary cell manufacturing method according to claim 3, further comprising:
    before welding the lid member to the outer case, transferring the outer case, the lid member, and the cap, in a state where the cap is disposed over the liquid injection hole and the lid member is disposed over the opening of the outer case, to a place where welding of the lid member is performed, wherein
    during transferring the outer case, the lid member, and the cap, the position of the cap is held by a magnetic repulsive force between the first magnetic body and the second magnetic body.

5. The secondary cell manufacturing method according to claim 3, wherein:
    the cap has a flange part that is disposed so as to cover the liquid injection hole and an insert part that is inserted into the liquid injection hole, and
    in a state where the position of the cap is held by the magnetic force, the flange part of the cap is disposed so as to face a portion of the lid member around the liquid injection hole, with a communication path that allows communication between the inside and the outside of the outer case formed between the portion around the liquid injection hole and the flange part.

6. The secondary cell manufacturing method according to claim 5, wherein:
    the communication path is a recessed groove provided in the flange part.

7. The secondary cell manufacturing method according to claim 1, wherein
    the cap includes the first magnetic body and a resin member with the first magnetic body embedded inside.

8. The secondary cell manufacturing method according to claim 7, wherein:
    the resin member is made of perfluoro-alkoxyfluoro plastics.

9. The secondary cell manufacturing method according to claim 1, wherein
    when the cap is disposed so as to cover the liquid injection hole provided in the lid member, the cap is transferred by a transfer mechanism including a third magnetic body, and the first magnetic body and the third magnetic body are magnetically attracted to each other while the transfer mechanism is transferring the cap.

10. The secondary cell manufacturing method according to claim 9, wherein
    the transfer mechanism includes a guide that has a contact surface with which a top surface of the cap is in contact in a state where the first magnetic body and the third magnetic are magnetically attracted to each other, and
    on an opposite side from the contact surface, the third magnetic body is movable relative to the guide in a direction of an axis of the cap.

11. The secondary cell manufacturing method according to claim 10, wherein:
    the contact surface has a protrusion,
    the top surface of the cap has a recess, and
    the protrusion and the recess are engaged with each other in the state where the first magnetic body and the third magnetic body are magnetically attracted to each other.

12. The secondary cell manufacturing method according to claim 1, wherein:
    the cap has a flange part that is disposed so as to cover the liquid injection hole and an insert part that is inserted into the liquid injection hole, and
    a leading end portion of the insert part has a tapered truncated conical shape.

13. The secondary cell manufacturing method according to claim 1, wherein:
    a guide member is provided that is disposed so as to face a side surface of the outer case to hold the position of the cap by the magnetic force.

* * * * *